United States Patent
Jatschka et al.

(10) Patent No.: US 8,140,053 B2
(45) Date of Patent: Mar. 20, 2012

(54) MOBILE TELECOMMUNICATIONS TERMINAL COMPRISING RFID FUNCTIONS AND ASSOCIATED METHOD

(75) Inventors: Thomas Jatschka, Klein Engersdorf (AT); Alfred Pohl, Mistelbach (AT); Robert Tschofen, Vienna (AT); Gernot Zimmermann, Vienna (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1112 days.

(21) Appl. No.: 11/665,240

(22) PCT Filed: Aug. 2, 2005

(86) PCT No.: PCT/EP2005/053760
§ 371 (c)(1),
(2), (4) Date: Nov. 6, 2007

(87) PCT Pub. No.: WO2006/040202
PCT Pub. Date: Apr. 20, 2006

(65) Prior Publication Data
US 2008/0100419 A1 May 1, 2008

(30) Foreign Application Priority Data
Oct. 13, 2004 (EP) .................................. 04024432

(51) Int. Cl.
*H04M 1/66* (2006.01)
*H04M 1/725* (2006.01)
*H04M 3/00* (2006.01)

(52) U.S. Cl. ...................... 455/410; 455/412.1; 455/419
(58) Field of Classification Search .......... 455/410–411, 455/414.1, 414.2, 41.2, 41.3, 41.1, 550.1, 455/552.1, 556.1, 90.1, 90.2, 405–406, 418–420, 455/412.1, 414.3

See application file for complete search history.

(56) References Cited

U.S. PATENT DOCUMENTS

| | | | | |
|---|---|---|---|---|
| 7,493,082 | B2 * | 2/2009 | Perttila | 455/41.2 |
| 7,710,238 | B2 * | 5/2010 | Jei et al. | 340/10.1 |
| 7,728,995 | B2 * | 6/2010 | Noble | 358/1.15 |
| 7,917,123 | B2 * | 3/2011 | Juntunen | 455/411 |
| 7,920,827 | B2 * | 4/2011 | Huomo et al. | 455/41.1 |
| 2003/0218532 | A1 | 11/2003 | Hussmann | |
| 2004/0235463 | A1 * | 11/2004 | Patel | 455/418 |
| 2006/0119471 | A1 * | 6/2006 | Rudolph et al. | 340/10.41 |

FOREIGN PATENT DOCUMENTS

| | | | |
|---|---|---|---|
| GB | 2 306 080 A | | 4/1997 |
| GB | 2306080 A | * | 4/1997 |
| WO | WO 00/74406 A1 | * | 12/2000 |
| WO | WO 02/49322 A2 | | 6/2002 |

* cited by examiner

*Primary Examiner* — Brandon Miller

(57) ABSTRACT

A mobile telecommunications terminal comprising RFID functions, in addition to an associated method are provided. In one aspect, the terminal comprises a telecommunications interface, a user interface and a data processing unit. A modification made with the aid of an RFID transponder circuit to be controlled via of RFID data records that are stored in an RFID memory unit in such a way that a flexible RFID transponder emulation is achieved at minimal cost.

20 Claims, 2 Drawing Sheets

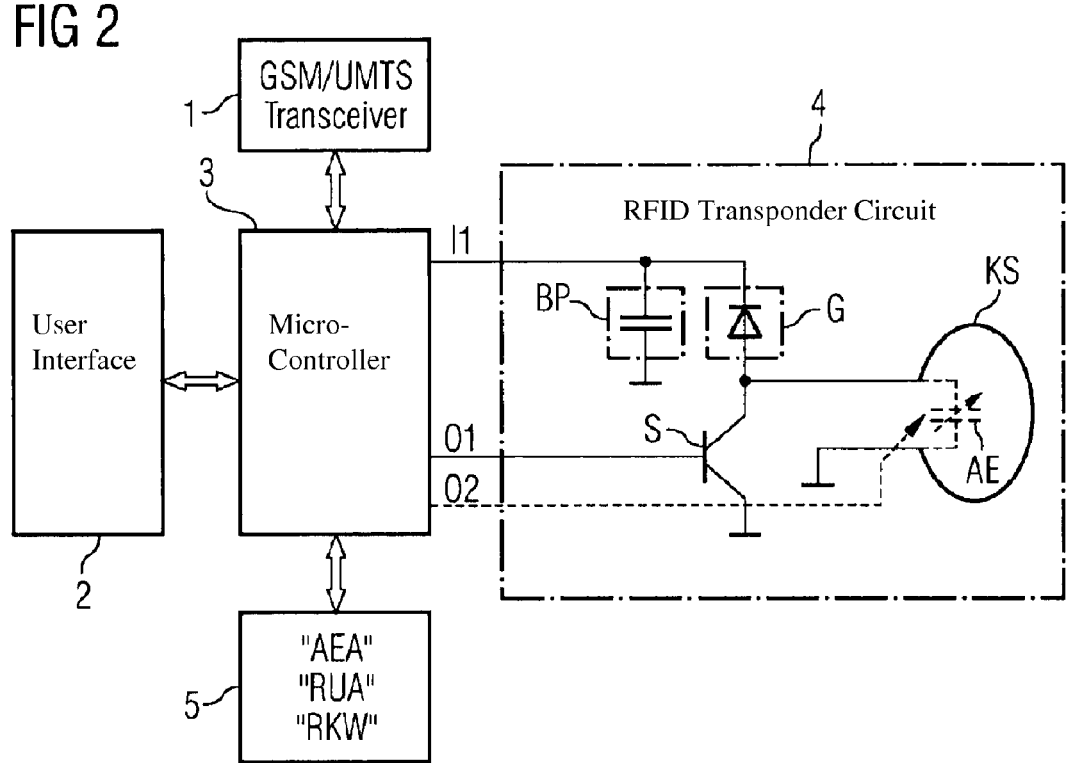

MOBILE TELECOMMUNICATIONS TERMINAL COMPRISING RFID FUNCTIONS AND ASSOCIATED METHOD

CROSS REFERENCE TO RELATED APPLICATIONS

This application is the U.S. National Stage of International Application No. PCT/EP2005/053760, filed Aug. 2, 2005 and claims the benefit thereof. The International Application claims the benefits of European application No. 04024432.9 EP filed Oct. 13, 2004, both of the applications are incorporated by reference herein in their entirety.

FIELD OF INVENTION

The present invention relates to a mobile telecommunications terminal with RFID functionality as well as an associated method and in particular a mobile telecommunications terminal such as a mobile handset, by way of example, with which an RFID transponder or TAG can be implemented inexpensively and so as to be capable of being changed as desired.

BACKGROUND OF INVENTION

RFID (Radio Frequency IDentification) transponders or so-called RFID TAGs are increasingly being used as a replacement for the so-called EAN (European article number) barcode. In this respect, an article identification or so-called parameter data is transmitted wirelessly in an electromagnetic manner, it being possible for the labels or parameter data to contain a large number of items of information. The RFID technology is already being used in a large number of application areas, it being necessary to mention the implementation of access control systems in particular alongside the article identification described in the foregoing.

RFID transponders or RFID TAGs of this type are customarily implemented by means of a control circuit designed specifically for the purpose, which is connected to a corresponding coupling coil and fused into a casing. In this respect, an activation signal generated by an RFID reader unit is picked up by the coupling coil of the RFID transponder and analyzed by the specific control circuit, the parameter data stored in the control circuit being, in the case of the capture of a valid activation signal, sent in turn via the coupling coil to the RFID reader unit. By this means, a contactless analysis of the RFID parameter data can be effected and, by way of example, an access control system implemented.

RFID transponders or TAGs of this type are customarily implemented without their own energy supply, an energy supply being derived from the radiated electromagnetic energy of the RFID reader unit.

SUMMARY OF INVENTION

A disadvantage in the case of conventional RFID transponders of this type, however, is the fact that they have to be given out and distributed to respective users, which results in a considerable additional cost in the case of the implementation of access control systems in particular.

An object underlying the invention is therefore to create a mobile telecommunications terminal with RFID functionality as well as an associated method, by means of which an access authorization can be distributed very simply and inexpensively particularly in existing access control systems.

According to the invention, this object is achieved with regard to the mobile telecommunications terminal and by the method as described by the independent claims.

In particular, by the use of an RFID transponder circuit, which is directly connected to the data processing unit, that is present in any case, of the mobile telecommunications terminal, and also an RFID memory unit for storing an activation signal recognition algorithm for recognizing an RFID activation signal, and a loadable RFID parameter data transmission algorithm for transmitting the RFID parameter data, the data processing unit together with the RFID transponder circuit can, by the use of the loadable algorithms, generate an RFID transponder emulator that sends out RFID parameter data like a conventional RFID transponder as a function of an RFID activation signal. The cost of this is minimal since a large number of elements that are present in any case in a mobile telecommunications terminal, such as the data processing unit in particular, are used for implementing the RFID functionality.

Preferably, for the purposes of implementing the RFID transponder circuit, a lead of a coupling coil is connected to ground, a further lead of the coupling coil connected via a rectifier and a bandpass filter to an RFID input of the data processing unit for capturing the RFID activation signal, an RFID output (O1) of the data processing unit connected to an input of a switching element, a lead of the switching element connected to ground, and a further lead of the switching element connected to the further lead of the coupling coil, wherein the data processing unit, after receiving the RFID activation signal at the RFID input, outputs the RFID parameter data in accordance with the RFID parameter data transmission algorithm at the RFID output. This form of implementation represents a particularly simple and inexpensive solution.

Preferably, the RFID transponder circuit can have a tuning element in the form of an electrically controllable tuning capacitor for tuning the coupling coil, it being possible to activate the tuning element by means of an RFID tuning output of the data processing unit. By this means, at least two or more RFID frequencies can be implemented or supported with one single coupling coil, by means of which an extraordinarily high level of flexibility is produced for the most diverse RFID reader units or systems.

Preferably, the activation signal recognition algorithm and the RFID parameter data transmission algorithm, and also the associated RFID parameter data can be loaded as a function of a user input via a telecommunications interface of the mobile telecommunications terminal and the communications network connected to it, by a service provider. As a result, a distribution of access authorizations can be implemented particularly simply and inexpensively by the use of existing communications networks. In this respect, the loadable algorithms preferably represent secure algorithms, by means of which a security aspect is also taken into account.

With regard to the method for controlling a communication system consisting of a mobile telecommunications terminal described in the foregoing, an RFID reader unit, a communications network, which is connected to the mobile telecommunications terminal, and a service provider unit, which is connected to the communications network and manages the RFID reader unit, the service provider unit provides an activation signal recognition algorithm matching the RFID reader unit, an RFID parameter data transmission algorithm, and also corresponding RFID parameter data for the mobile telecommunications terminal. The distribution of the data relevant for an access authorization, for example, can consequently be effected via conventional telecommunications networks, the mobile telecommunications terminal modified according to the invention then acting as an RFID transponder emulator and enabling a corresponding access authorization to the most diverse systems or areas. In this respect, the user friendliness and also flexibility is extraordinarily high, the costs being extremely low on the basis of the use of system elements that are present in any case and just a minimal modification of the terminal.

Preferably, a charging process can be carried out during the provision of the RFID algorithms and also RFID parameter data, by means of which commercial access control systems can also be implemented without difficulty.

Furthermore, the service provider unit can be connected to the RFID reader unit and carry out a verification of the sent RFID parameter data via the telecommunications interface and the commercial network, by means of which security-related access control systems that require a redundancy check can also be implemented.

Furthermore, an identification of a user can be carried out via the RFID transponder circuit of the mobile telecommunications terminal and a charging process via the telecommunications interface of the same device, it being possible to use a charging platform already present for the telecommunications interface as a billing platform for an access authorization also. The effectiveness and also user friendliness of a device of this type is further improved as a result.

In one embodiment, a mobile telecommunication terminal with RFID functionality has a telecommunications interface 1 for implementing wireless communication with a communications network N; a user interface 2 for inputting/outputting data from/to a user; and a data processing unit 3 for controlling the telecommunications interface 1, the user interface 2, and basic functions of the mobile telecommunications terminal ME. The terminal also has an RFID transponder circuit 4 that is directly connected to the data processing unit 3 and an RFID memory unit 5 for storing an activation signal recognition algorithm AEA for recognizing an RFID activation signal, RFID parameter data RKW, and an RFID password data transmission algorithm RUA for transmitting the RFID parameter data. The processing unit 3 activates the RFID transponder circuit (4) by using the activation signal recognition algorithm AEA and the RFID password data transmission algorithm (RSA) in such a way that the RFID parameter data RKW is sent as a function of the RFID activation signal. The loadable RFID algorithms AEA, RUA and RFID parameter data RKW can be updated and/or deleted as frequently as desired in the RFID memory unit 5.

Further advantageous embodiments of the invention are characterized in the dependent claims.

BRIEF DESCRIPTION OF THE DRAWINGS

In the following, the invention is described in detail on the basis of an exemplary embodiment while making reference to the drawing.

The diagrams show:

FIG. 2—a simplified schematic representation of the mobile telecommunications terminal according to the invention as shown in FIG. 1.

DETAILED DESCRIPTION OF INVENTION

Figure 1:
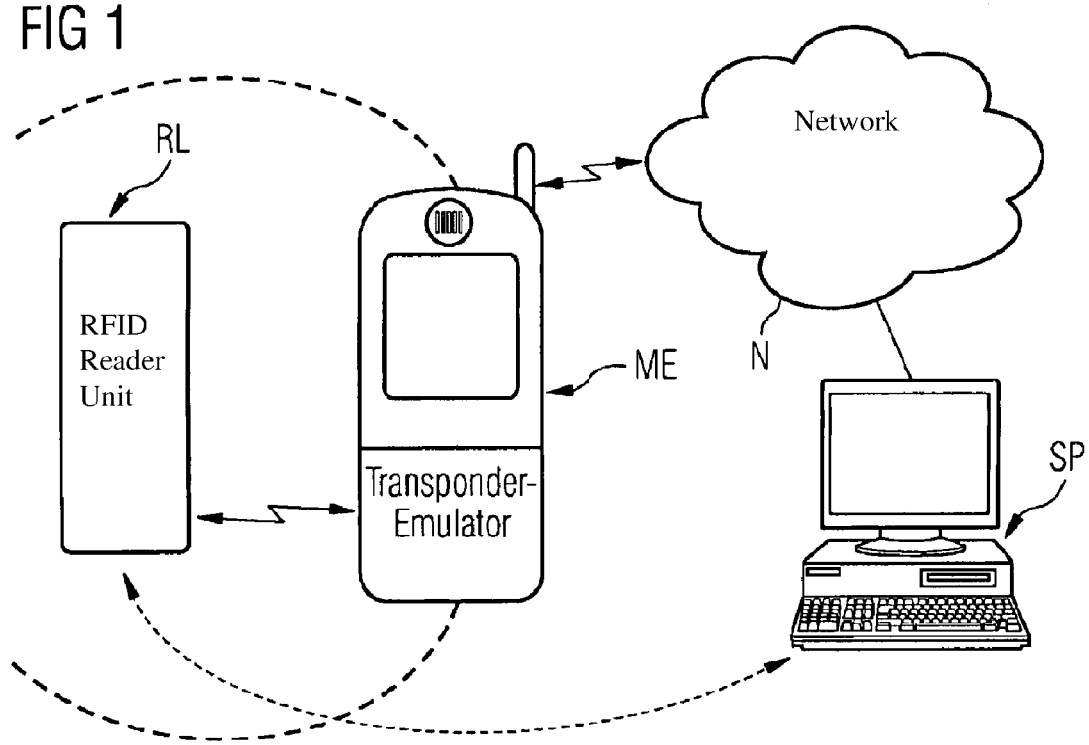
FIG. 1—a simplified schematic representation of a communications system with a mobile telecommunications terminal according to the invention.

FIG. 1 shows a simplified schematic circuit diagram of a communications system in which, by way of example, a mobile telecommunications terminal according to the invention with RFID (Radio Frequency IDentification) functionality can be operated. The mobile telecommunications terminal ME represents, by way of example, a mobile handset, a PDA (Personal Digital Assistant) with wireless interface, etc., which is connected via a wireless interface such as, for example, GSM (Global System for Mobile communication), UMTS (Universal Mobile Telecommunication System), etc. to a communications network N. In this respect, the communications network N can represent a mobile communication network, by way of example, which in turn can be connected to a superordinate or parallel network. Networks of this type that are not shown comprise, by way of example, packet-based networks such as the Internet or circuit-switched or circuit-based networks such as the conventional analog or digital fixed networks (PSTN, Public Switched Telephone Network). Furthermore, a service provider unit SP is connected to the communications network N, which service provider unit, by way of example, has a server or a data processing unit and offers various services within the communications network N or answers service inquiries.

As shown in FIG. 1, a so-called RFID reader unit RL is furthermore provided, which can activate and read RFID transponders or RFID TAGs in the customary manner. Preferably, the RFID reader unit RL is managed by the service provider unit SP or is allocated to same, by means of which, by way of example, access control systems can be implemented very simply and inexpensively.

In the following, the invention is described on the basis of an access control system, one or more RFID reader units RL controlling access to a specified area such as, by way of example, a company site, a skiing area, a theatre, etc.

While respective RFID transponders or RFID TAGs, often to be used only once, had to be distributed as access authorization cards or admission cards by central or local issuing points in the past, this distribution of the access authorization can be effected in a very simple manner via a telecommunications network in the case of the system according to the invention by using a conventional and only slightly modified mobile telecommunications terminal ME.

If, consequently, a user needs an access authorization to an area of this type equipped with an access control system, he can, for example, set up a connection to the service provider or its service provider unit SP via his telecommunications interface located within the mobile telecommunications terminal and via the communications network N and request a corresponding access authorization. In the same way, this requesting of the access authorization can also be effected via any desired Internet terminal by specifying a destination address for the mobile telecommunications terminal on which the data relating to the access authorization is to be loaded.

In more accurate terms, a user can dial up an Internet homepage of a service provider, by way of example, via his mobile telecommunications terminal ME or mobile handset, which service provider offers access authorizations of this type such as, by way of example, theatre tickets, skiing day passes, etc., and purchase same there. In contrast to the customary procedure, in which the access authorizations or, for example, theatre tickets are sent by ordinary mail or deposited at a central point, an electronic access authorization in the form of an activation signal recognition algorithm, an RFID parameter data transmission algorithm, and the RFID parameter data is then sent via the communications network N to the mobile telecommunications terminal ME and stored there by using the function elements of the mobile telecommunications terminal ME that are present in any case, according to the invention. This transmission is preferably implemented by means of a secure transmission in order to prevent unauthorized access or tampering.

By using these algorithms then stored in the mobile telecommunications terminal for recognizing the activation signal and for transmitting the actual RFID parameter data, a mobile telecommunications terminal ME modified minimally with regard to its hardware structure can then implement a transponder emulator and as it were imitate conventional RFID transponders or TAGs with regard to their functionality. In more accurate terms, a data processing unit of the mobile telecommunications terminal ME is placed in a state by using the activation signal recognition algorithm, with the aid of which it can reliably recognize an RFID activation signal applied to a predetermined input of the data processing unit. Furthermore, by using the RFID parameter data transmission algorithm, the RFID parameter data similarly [sent] via the communications network N and stored in the mobile telecommunications terminal ME can be transmitted according to a predetermined schema that corresponds to the transmission schema expected by the associated RFID reader unit RL, by means of which the RFID parameter data can be sent reliably from the mobile telecommunications terminal ME to the RFID reader unit RL, for example. Naturally, in the case of an RFID transmission mechanism of this type, information can also be received by the RFID reader unit, by means of which, by way of example, in the case of an access system with a limited quantity of value points, said value points can be reduced by a predetermined amount by the RFID reader unit in each case. In the same way, other modifications of the RFID parameter data stored in the mobile telecommunications terminal ME are also conceivable.

According to the invention, an RFID transponder functionality can consequently be implemented in an inexpensive and extremely flexible manner by means of an emulation of the RFID function by using a mobile telecommunications terminal.

Preferably, a charging process is carried out during the provision of the RFID algorithms and also the RFID parameter data, it being possible essentially to utilize the charging platforms customarily used inside and outside the Internet. Preferably, however, a charging process can be carried out via a charging platform of the telecommunications interface of the terminal ME, which charging platform is already present, by way of example, in the form of chargeable SMS text messages, by means of which a charging process can be carried out without additional registration via charging systems allocated to the mobile telecommunications terminal, i.e., by way of example, the telephone bill. An extremely user friendly billing in the case of the issuing of, by way of example, access authorizations, is produced as a result.

Furthermore, for example, an identification of a user is carried out via the RFID functionality of the mobile telecommunications terminal and a charging process in turn via the telecommunications interface. By this means, payment, for example in supermarkets, etc., can also be implemented extremely securely and reliably, the user friendliness being further increased.

For the purposes of implementing enhanced security measures, the RFID reader unit can furthermore be connected to the service provider unit SP, a verification of the sent RFID parameter data via the telecommunications interface of the mobile telecommunications terminal ME and the communications network N being carried out within the service provider unit SP by means of comparison of the parameter data transmitted via the different connection paths. Only in the case of agreement of the two data records is an access authorization issued to the RFID reader unit or a charging process carried out, by way of example. In the case of a configuration of this type, complex security measures are also conceivable such as, for example, the time-conditioned possibility of generating the RFID transponder functionality in the terminal.

Furthermore, the mobile telecommunications terminal can be used not just for a predetermined type of RFID reader unit RL according to the invention, but instead be configured for a large number of different RFID reader units of different service providers. Consequently, several RFID data records consisting of an RFID activation signal recognition algorithm, an RFID parameter data transmission algorithm, and the RFID parameter data can also be stored in a mobile telecommunications terminal, by means of which a multiple usability of the mobile telecommunications terminal as a modifiable RFID transponder is also produced. Consequently, by way of example, both the access authorizations for a metro system and also for a theatre can be stored simultaneously in the mobile telecommunications terminal and therefore corresponding "different" RFID transponders emulated, by means of which mutually differing RFID reader units for, by way of example, the metro system and the theatre can also be served.

The transmission of the RFID data records to the mobile telecommunications terminal ME can be implemented in the most diverse manner by using the telecommunications interface that is present in any case, so-called SMS or MMS messages with secure or encrypted data transmission preferably being used, however.

FIG. 2 then shows a simplified schematic representation of fundamental function blocks of the mobile telecommunications terminal ME as shown in FIG. 1, only minor hardware modifications being necessary for implementing the RFID functionality.

As shown in FIG. 2, the mobile telecommunications terminal possesses a telecommunications interface 1 for supporting, by way of example, a GSM or UMTS wireless interface. Further wireless interfaces such as, by way of example, WLAN, Bluetooth, etc., are also known, however, via which a connection can be implemented to a communications network N. The telecommunications interface 1 is controlled in the customary manner by a data processing unit 3 of the mobile terminal ME, a microcontroller preferably being used. Naturally, alternative data processing units such as, by way of example, multiprocessor or mixed-processor systems can also be used, which essentially control the basic functions of the mobile telecommunications terminal ME. For the purposes of implementing communication with a user, the mobile telecommunications terminal furthermore has a user interface 2, which in turn is activated by the data processing unit 3 and, by way of example, includes a microphone, a loudspeaker, a display unit, and also a keypad. Naturally, further function units can also be present for implementing a user input/output functionality. Since all these function blocks are present in any case in conventional mobile telecommunications terminals, fundamental cost savings are produced for the implementation of an RFID functionality or an RFID transponder by using a mobile telecommunications terminal.

As shown in FIG. 2, a conventional mobile telecommunications terminal must consequently just be supplemented with an RFID transponder circuit 4, which is directly connected to the data processing unit 3, the data processing unit 3 activating the RFID transponder circuit 4 by using an activation recognition algorithm AEA, an RFID parameter data transmission algorithm RÜA and RFID parameter data RKW in such a way that the RFID parameter data is sent as defined by the RFID parameter data transmission algorithm as a function of an RFID activation signal sent by the RFID reader unit. The RFID data records AEA, RÜA, and RKW are stored in an RFID memory unit 5 for the purpose, which, by way of example, represents a sub-area of a memory, that is in turn present in any case, of the mobile telecommunications terminal ME.

Consequently, the RFID data records, i.e. the RFID activation signal recognition algorithm, the RFID parameter data transmission algorithm, and the actual RFID parameter data can be loaded into the RFID memory unit 5 via the telecommunications interface 1, the data processing unit 3 in connection with the RFID transponder circuit 4 initially emulating an RFID activation signal recognition. In this respect, the signals captured at an RFID input I1 of the data processing unit 3 are analyzed and in the case of a specific signal sequence, i.e. the "activation signal sequence", interpreted as RFID activation. As soon as an RFID activation of this type is recognized by the data processing unit 3, the RFID parameter data RKW stored in the memory unit 5 is output correspondingly at an RFID output O1 by using the RFID parameter data transmission algorithm RÜA. In the case of a bidirectional transmission, moreover, further information or parameter data can also be received at the RFID input I1 in the case of an RFID transmission of this type.

For the purposes of implementing an RFID transmission or RFID activation of this type, the RFID transponder circuit 4 has a coupling coil KS as an antenna element for receiving electromagnetic radiation, as emitted by the RFID reader unit RL, for example in the form of an activation signal. At the same time, this coupling coil KS is also used as a transmitting antenna for sending the RFID parameter data RKW to the RFID reader unit RL. Furthermore, the RFID transponder circuit 4 has a bandpass filter BP for limiting a frequency range and a rectifier G for converting the AC signal received into a DC signal. For the purposes of modulating or generating a transmit signal, the RFID transponder circuit furthermore possesses a switching element S, which in turn is connected to an RFID output O1 of the data processing unit 3 on the input side and to the coupling coil KS on the output side.

In more accurate terms, as shown in FIG. 2, a lead of the coupling coil KS is connected to ground, while a further lead of the coupling coil KS is connected via the rectifier G and the bandpass filter BP to the RFID input I1 of the data processing unit 3 for capturing the RFID activation signal or the data sent by the RFID reader unit. On the other hand, the RFID output O1 of the data processing unit 3 is connected to the input of the switching element S, a lead or output of the switching element S being connected to ground and a further lead or output of the switching element S being connected to the further lead of the coupling coil KS.

In the preferred exemplary embodiment as shown in FIG. 2, which represents a very simple and therefore inexpensive implementation of the transponder circuit 4, the bandpass filter consists of a capacitor, which is connected to ground with the aid of one lead and connected to the RFID input I1 of the data processing unit 3 with the aid of its further lead. Furthermore, the rectifier G is implemented by means of a diode, which is connected in the inverse direction between the RFID input I1 and the further lead of the coupling coil KS. The switching element S preferably consists of a transistor and particularly a bipolar or field effect transistor, the base or the gate being connected to the RFID output O1 and the collector or the source being connected to ground, while the emitter or the drain is in turn connected to the further lead of the coupling coil KS. According to the invention, a conventional mobile telecommunications terminal ME can be modified just with four additional components in such a way that it implements an extremely flexible transponder emulator.

Since RFID transponders customarily operate from 100 to 135 kHz in the long-wave range, at 13.56 MHz or 27.125 MHz in the HF range, and at 400 to 950 MHz in the UHF range, but operation is also carried out at 2.45, 5.8 or 24.125 GHz in the microwave range, the RFID transponder circuit can have a tuning element AE for tuning the coupling coil KS for the purposes of increasing a further flexibility and particularly for the purposes of covering this large number of different frequency ranges. An electrically controllable tuning capacitor is preferably connected between the leads of the coupling coil KS as the tuning element AE, which capacitor can be activated via an RFID tuning output O2 of the microcontroller or the data processing unit 3. As a function of the RFID data records in the RFID memory 5, a coupling coil or antenna of the transponder circuit 4 can consequently be adjusted to respective frequency ranges, by means of which extremely different RFID reader units can be served and the flexibility of the mobile telecommunications terminal is further increased.

Public transport tickets, cinema tickets, ski passes, and also employee identification cards, etc. can be implemented flexibly and, by way of example, provided with an expiry date or a maximum quantity of permissible accesses by this means. Moreover, the access control systems continue to remain usable on a uniform basis for conventional RFID transponders or TAGs. For the purposes of implementing security-related systems with an additional verification, in particular, no further circuitry and costly signal processing stages are necessary, since the functionalities, that are present in any case, of the mobile telecommunications terminal can be used in a particularly effective manner. By this means, this additional RFID functionality can be implemented with a minimal additional technical cost or with a very slight modification and by means of only a very low co-utilization of the computing power of the data processing unit of the mobile telecommunications terminal. Furthermore, the separation problem customarily present in the case of alternative wireless systems ceases to apply due to the short-range coupling (e.g. 50 centimeters of the emulated RFID transponder).

In the foregoing, the invention was described on the basis of a mobile telecommunications terminal in the form of a mobile handset. It is not restricted to this, however, and also includes further mobile telecommunications terminals.

The invention claimed is:
1. A method for using at least one communications system with a mobile telecommunications terminal, the at least one communications system comprising:
    a first communications system comprising:
        an RFID reader unit for sending an RFID activation signal and for reading RFID parameter data of the mobile telecommunications terminal,
        a communications network connectable to the mobile telecommunications terminal, and
        a service provider unit connected to the communications network, the service provider unit managing the RFID reader unit;
    the method comprising:
    providing the mobile telecommunications terminal comprising:
        a telecommunications interface for implementing wireless communication with the communications network,
        a user interface, a data processing unit for controlling the telecommunications interface, the user interface, and basic functions of the mobile telecommunications terminal,
an RFID transponder circuit directly connected to the data processing unit, and
an RFID memory unit accessible by the data processing unit;
receiving by the mobile telecommunications terminal a transmission from the service provider unit of the first communications system, the received transmission comprising an activation signal recognition algorithm for recognizing the RFID activation signal from the RFID reader unit of the first communications system, an RFID parameter data transmission algorithm for transmitting the RFID parameter data for the first communications system, and the RFID parameter data for the first communications system; and
storing the activation signal recognition algorithm, the RFID parameter data, and the RFID parameter data transmission algorithm received from the service provider unit of the first communications system in the RFID memory unit; and
wherein the data processing unit activates the RFID transponder circuit by using the activation signal recognition algorithm and the RFID parameter data transmission algorithm such that the RFID parameter data is sent to the RFID reader unit of the first communications system as a function of the RFID activation signal sent by the RFID reader unit of the first communications system.

2. The method of claim 1 wherein the RFID transponder circuit comprises a coupling coil, a bandpass filter, a rectifier, and a switching element.

3. The method of claim 2 wherein the mobile telecommunications terminal further comprises:
a first lead of the coupling coil connected to ground;
a second lead of the coupling coil connected via the rectifier and the bandpass filter to an RFID input of the data processing unit for capturing the RFID activation signal;
an RFID output of the data processing unit connected to an input of the switching element;
a first lead of the switching element connected to ground; and
a second lead of the switching element connected to the second lead of the coupling coil; and
wherein the data processing unit, after receiving the RFID activation signal at the RFID input, outputs the RFID parameter data at the RFID output.

4. The method of claim 2 wherein the bandpass filter is implemented via a capacitor, which is connected to ground via a first lead and connected to the RFID input of the data processing unit via a second lead.

5. The method of claim 2 wherein the rectifier is implemented via a diode, which is connected between the RFID input and the second lead of the coupling coil.

6. The method of claim 2 wherein the RFID transponder circuit comprises a tuning element for tuning the coupling coil.

7. The method of claim 6 wherein the tuning element is connected to an RFID tuning output of the data processing unit and is activated by an RFID tuning output of the data processing unit.

8. The method of claim 6 wherein the tuning element comprises an electrically controllable tuning capacitor.

9. The method of claim 1 wherein the activation signal recognition algorithm, the RFID parameter data, and the RFID parameter data transmission algorithm are loadable via the telecommunications interface and the communications network as a function of a user input.

10. The method of claim 9 wherein the loadable RFID algorithms and RFID parameter data represent secure algorithms and data.

11. The method of claim 9 wherein the loadable RFID algorithms and RFID parameter data are updatable and in the RFID memory unit.

12. The method of claim 9 wherein the loadable RFID algorithms and RFID parameter data are deletable and in the RFID memory unit.

13. The method as claimed in claim 1, wherein a charging process occurs in response to the transmitting of the RFID parameter data transmission algorithm and the RFID parameter data.

14. The method as claimed in claim 13, wherein the RFID transponder circuit identifies a user and wherein the charging process is via the telecommunications interface.

15. The method as claimed in claim 1, wherein the transmission is secure in order to prevent unauthorized access.

16. The method as claimed in claim 1, wherein the service provider unit of the first communications system is connected to the RFID reader unit of the first communications system and verifies the RFID parameter data via the telecommunications interface and the communications network of the first communications system.

17. The method of claim 1 wherein the RFID activation signal is received by an input of the data processing unit.

18. The method of claim 17 wherein the RFID parameter data is sent to the RFID reader unit of the first communications system utilizing a transmission schema that corresponds to a transmission schema expected by the RFID reader unit of the first communications system and wherein the activation signal recognition algorithm and the RFID parameter data transmission algorithm function as an RFID transponder emulator.

19. The method of claim 18 wherein the at least one communications system also comprises a second communications system, the second communications system comprising:
an RFID reader unit for sending an RFID activation signal and for reading second RFID parameter data of the mobile telecommunications terminal,
a communications network connectable to the mobile telecommunications terminal, and
a service provider unit connected to the communications network of the second communications system, the service provider unit of the second communications system managing the RFID reader unit of the second communications system;
the method further comprising:
receiving by the mobile telecommunications terminal a transmission from the service provider unit of the second communications system, the received transmission from the service provider unit of the second communications system comprising a second activation signal recognition algorithm for recognizing the RFID activation signal from the RFID reader unit of the second communications system, a second RFID parameter data transmission algorithm for transmitting the second RFID parameter data to the RFID reader unit of the second communications system, and the second RFID parameter data for the second communications system; and
storing the second activation signal recognition algorithm, the second RFID parameter data for the second communications system, and the second RFID parameter data transmission algorithm received from the service provider unit of the second communications system in the RFID memory unit; and wherein the data processing unit activates the RFID transponder circuit by using the second activation signal recognition algorithm and the second RFID parameter data transmission algorithm received from the service provider unit of the second communications system such that the second RFID parameter data is sent to the RFID reader unit of the second communications system as a function of the RFID activation signal sent by the RFID reader unit of the second communications system.

20. A communications system comprising:

an RFID reader unit for sending an RFID activation signal and for reading RFID parameter data of a mobile telecommunications terminal;

a communications network connectable to the mobile telecommunications terminal;

a service provider unit connected to the communications network, the service provider unit managing the RFID reader unit; and a mobile telecommunications terminal, the mobile telecommunications terminal comprising:

a telecommunications interface for implementing wireless communication with the communications network, a user interface, a data processing unit for controlling the telecommunications interface, the user interface, and functions of the mobile telecommunications terminal, an RFID transponder circuit connected to the data processing unit, and an RFID memory unit accessible by the data processing unit; and the service provider unit sending a transmission to the mobile telecommunications terminal, the received transmission comprising an activation signal recognition algorithm for recognizing the RFID activation signal from the RFID reader unit, an RFID parameter data transmission algorithm for transmitting the RFID parameter data, and the RFID parameter data for the communications system; and the mobile telecommunications terminal storing the activation signal recognition algorithm, the RFID parameter data, and the RFID parameter data transmission algorithm received from the service provider unit in the RFID memory unit; and wherein the data processing unit activates the RFID transponder circuit by using the activation signal recognition algorithm and the RFID parameter data transmission algorithm such that the RFID parameter data is sent to the RFID reader unit as a function of the RFID activation signal sent by the RFID reader unit.

* * * * *